United States Patent
Habdank et al.

(10) Patent No.: US 8,882,073 B2
(45) Date of Patent: Nov. 11, 2014

(54) SUPPORT ARRANGEMENT FOR SOLAR MODULES

(75) Inventors: Martin Habdank, Heiningen (DE); Peter Habdank, Heiningen (DE); Ralf Baumann, Wernau (DE)

(73) Assignee: Habdank PV-Montagesysteme GmbH & Co. KG, Goeppingen (DE)

( * ) Notice: Subject to any disclaimer, the term of this patent is extended or adjusted under 35 U.S.C. 154(b) by 380 days.

(21) Appl. No.: 13/318,726

(22) PCT Filed: May 11, 2010

(86) PCT No.: PCT/EP2010/056460
§ 371 (c)(1),
(2), (4) Date: Nov. 3, 2011

(87) PCT Pub. No.: WO2010/130736
PCT Pub. Date: Nov. 18, 2010

(65) Prior Publication Data
US 2012/0056066 A1    Mar. 8, 2012

(30) Foreign Application Priority Data

May 15, 2009    (DE) .......................... 10 2009 003 151

(51) Int. Cl.
*F16M 13/00*    (2006.01)
*H01L 31/042*    (2014.01)
*F24J 2/52*    (2006.01)

(52) U.S. Cl.
CPC ........... *H01L 31/0422* (2013.01); *F24J 2/5264* (2013.01); *F24J 2/5232* (2013.01); *Y02E 10/47* (2013.01); *Y02E 10/50* (2013.01); *F24J 2/526* (2013.01); *F24J 2/5243* (2013.01)
USPC ...................... 248/419; 248/178.1; 248/188.7; 248/423; 248/220.21; 403/103; 52/93.1

(58) Field of Classification Search
USPC .................. 248/419, 157, 423, 424, 422, 425, 248/163.1, 432, 169, 205.1, 218.4, 219.1, 248/220.21, 220.42, 694, 688, 121, 123.11, 248/125.7, 126, 127, 133, 371, 397; 52/93.1, 713, 655.1, 173.3, 460, 463, 52/467, 468, 506.06, 220.3, 480, 483.1, 52/668, 669, 200; 403/103, 107
See application file for complete search history.

(56) References Cited

U.S. PATENT DOCUMENTS 3,566,762 A * 3/1971 Vadas et al. .................... 493/134
3,584,605 A * 6/1971 Schwartz ....................... 119/319
(Continued)

FOREIGN PATENT DOCUMENTS

DE    101 52 354 C1    5/2003
DE    203 03 257 U1    7/2003
(Continued)

OTHER PUBLICATIONS

International Search Report of PCT/EP2010/056460 Dated Dec. 20, 2010 with an English Translation.

*Primary Examiner* — Terrell McKinnon
*Assistant Examiner* — Monica Millner
(74) *Attorney, Agent, or Firm* — Venable LLP; Robert Kinberg

(57) ABSTRACT

A support arrangement for a solar module includes a post having a first surface section. A support structure includes a connecting element presenting a second surface section facing the first surface section in a direction of a joint surface normal of the first and second surface sections. A stop element is arranged in the surface normal direction offset to the first and second surface sections. A first form-fitting connection exists between the stop element and the post and a second form-fitting connection exists between the stop element and the connecting element, providing vertical support of the connecting element relative to the post. The first and second form-fitting connections are producible at different heights of the connecting element relative to the post. A fastening element holds in place the first surface section and the second surface section relative to each other in the direction of the joint surface normal.

17 Claims, 4 Drawing Sheets

(56) References Cited

U.S. PATENT DOCUMENTS

| | | | | |
|---|---|---|---|---|
| 3,651,840 | A * | 3/1972 | Ridenour | 83/759 |
| 3,654,818 | A * | 4/1972 | Hengehold | 74/331 |
| 3,778,903 | A * | 12/1973 | Gardella et al. | 433/28 |
| 3,799,717 | A * | 3/1974 | Nedoh | 425/125 |
| 3,876,353 | A * | 4/1975 | Nedoh | 425/90 |
| 3,936,158 | A * | 2/1976 | Cianciolo et al. | 359/873 |
| 3,990,623 | A * | 11/1976 | Fortune | 228/57 |
| 3,997,277 | A * | 12/1976 | Swisher et al. | 404/84.05 |
| 4,023,750 | A * | 5/1977 | Tigner | 244/16 |
| 4,158,382 | A * | 6/1979 | Oxenreider et al. | 164/305 |
| 4,284,122 | A * | 8/1981 | Oxenreider et al. | 164/98 |
| 4,359,917 | A * | 11/1982 | Wilger et al. | 82/128 |
| 4,377,197 | A * | 3/1983 | Oxenreider et al. | 164/112 |
| 4,516,195 | A * | 5/1985 | Gonser | 362/281 |
| 4,726,449 | A * | 2/1988 | Orndorff et al. | 187/413 |
| 4,765,443 | A * | 8/1988 | Cunningham | 188/24.21 |
| 5,115,992 | A * | 5/1992 | Nugent | 241/236 |
| 5,120,209 | A * | 6/1992 | MacMillan | 425/40 |
| 5,127,617 | A * | 7/1992 | Bergetz | 248/278.1 |
| 5,204,036 | A * | 4/1993 | MacMillan | 264/152 |
| 5,312,181 | A * | 5/1994 | Hudnall | 312/249.2 |
| 5,474,633 | A * | 12/1995 | Myers | 156/230 |
| 5,489,258 | A * | 2/1996 | Wohnsen et al. | 602/5 |
| 5,490,684 | A * | 2/1996 | Chapman | 280/47.11 |
| 5,492,353 | A * | 2/1996 | Chapman | 280/47.11 |
| 5,637,124 | A * | 6/1997 | Diachuk | 55/342 |
| 5,641,331 | A * | 6/1997 | Diachuk | 55/343 |
| 5,651,803 | A * | 7/1997 | Diachuk | 55/350.1 |
| 5,656,049 | A * | 8/1997 | Diachuk | 55/350.1 |
| 5,669,947 | A * | 9/1997 | Diachuk | 55/342 |
| 5,762,544 | A * | 6/1998 | Zuniga et al. | 451/285 |
| 5,884,948 | A * | 3/1999 | Weinerman et al. | 292/216 |
| 5,947,051 | A * | 9/1999 | Geiger | 114/313 |
| 6,042,080 | A * | 3/2000 | Shepherd et al. | 248/683 |
| 6,711,866 | B2 * | 3/2004 | Blount | 52/649.1 |
| 7,614,855 | B2 * | 11/2009 | Cook | 417/363 |
| 7,666,192 | B2 * | 2/2010 | Seegert et al. | 606/131 |
| 8,377,068 | B2 * | 2/2013 | Aker et al. | 606/87 |
| 8,398,645 | B2 * | 3/2013 | Aker et al. | 606/88 |
| 8,580,239 | B2 * | 11/2013 | Seegert et al. | 424/78.06 |
| 2002/0059768 | A1 * | 5/2002 | Blount | 52/600 |
| 2002/0170399 | A1 * | 11/2002 | Gass et al. | 83/62.1 |
| 2005/0234485 | A1 * | 10/2005 | Seegert et al. | 606/172 |
| 2006/0041448 | A1 * | 2/2006 | Patterson et al. | 705/1 |
| 2007/0282443 | A1 * | 12/2007 | Globerman et al. | 623/17.11 |
| 2010/0121311 | A1 * | 5/2010 | Seegert et al. | 604/522 |
| 2013/0017935 | A1 * | 1/2013 | Endelman et al. | 482/131 |

FOREIGN PATENT DOCUMENTS

| | | |
|---|---|---|
| DE | 203 19 065 U1 | 4/2004 |
| DE | 20 2005 008 159 U1 | 9/2005 |
| DE | 20 2005 012 993 U1 | 12/2005 |
| DE | 10 2005 018 687 B3 | 11/2006 |
| DE | 20 2006 011 393 U1 | 12/2006 |
| DE | 20 2008 01 010 U1 | 6/2008 |
| WO | WO-00/31477 | 6/2000 |
| WO | WO-2008/009530 | 1/2008 |

* cited by examiner

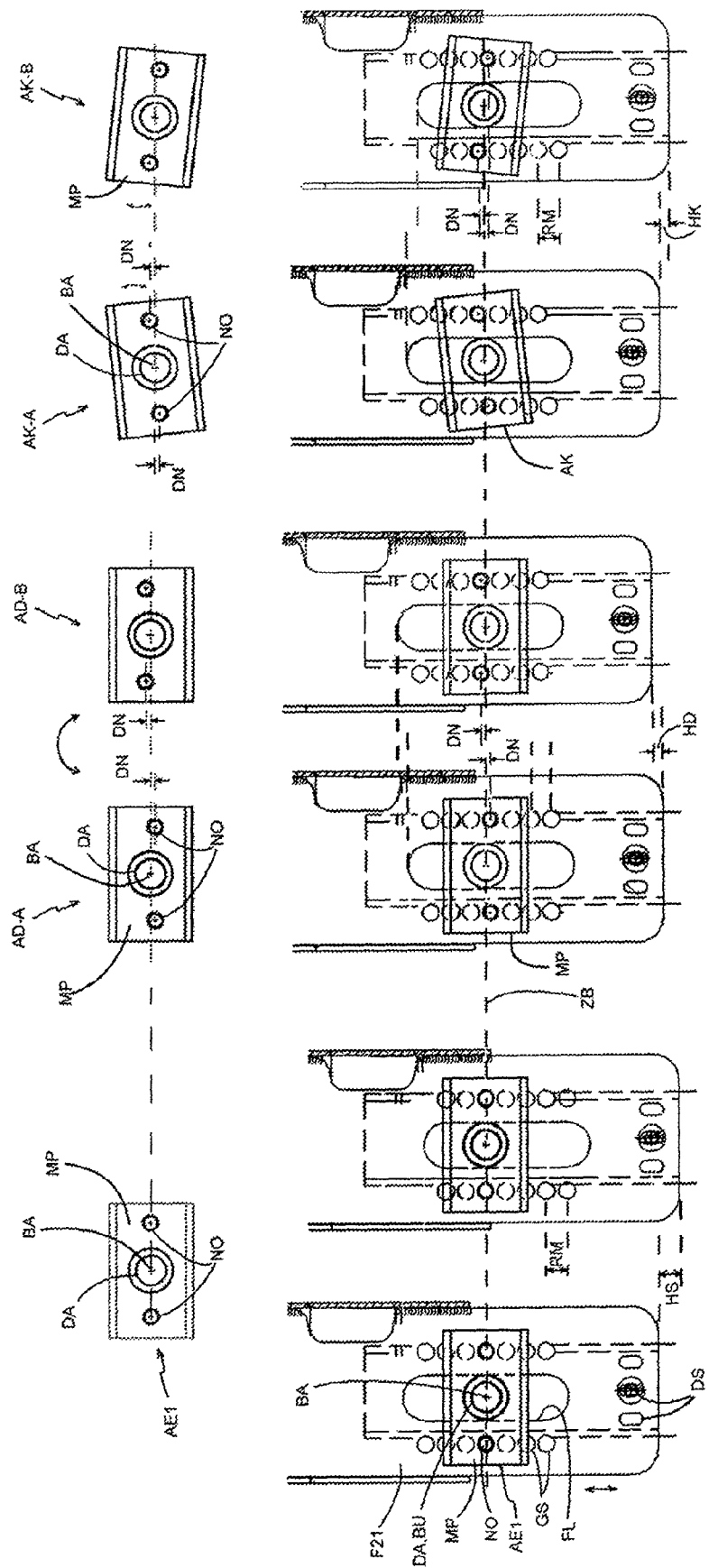

SUPPORT ARRANGEMENT FOR SOLAR MODULES

CROSS-REFERENCE TO RELATED APPLICATIONS

This application is a U.S. National Stage of International Application No. PCT/EP2010/056460, filed May 11, 2010, designating the United States and claiming priority to German Application No. DE 10 2009 003 151.0 filed May 15, 2009.

BACKGROUND OF THE INVENTION

The invention relates to a support arrangement for solar modules.

Solar systems comprising a plurality of solar modules, especially photovoltaic modules, are frequently embodied as outdoor systems for which posts must be anchored and in particular rammed into the ground. Support arrangements are attached via connecting elements to these posts, which are typically arranged in one or several rows. Support arrangements generally consist of one or several longitudinal supports, as well as module supports extending transverse thereto on which the solar modules are mounted.

Support arrangements of this type are known, for example, from the German patent documents DE 20 2005 008 159 U1, DE 203 03 257 U1, DE 20 2005 012 993 U1, and international patent publications WO 00/31477 A1 or WO 2008/009530 A2. German patent document DE 203 19 065 U1 additionally mentions the option of attaching a connecting element, embodied as a U-shaped yoke, to a post that the connecting element can be adjusted in height and tilted to the side.

Since the posts can be rammed in only with limited precision, it can be advantageous to have available a readjustment option, especially with respect to the height position of the connecting elements.

According to the German patent document DE 20 2008 001 010 U1, a connection claw is provided for the height adjustment and is screwed to the upper end of the post that is anchored in the ground, wherein the screws are fitted into elongated holes in the post and the connecting claw can thus be secured at different height positions, such that it is clamped against the side surfaces of the post.

The height-adjustment option with the aid of elongated holes is also known in connection with roof-mounting systems and is described, for example, in the German patent documents DE 101 52 354 C1 and DE 10 2005 018 687 B3, wherein the latter document discloses an embodiment provided with an elongated hole, provided with a toothing of opposite-arranged surfaces, wherein alternatively a row of bore holes can be provided through which the fastening screws can extend. When using aluminum profiles as structural components, the toothing can be produced relatively easily but has only a limited supporting capacity. Providing steel components, which are designed for high carrying capacity, with a toothing is expensive and the toothing can become clogged with anti-corrosion material during a subsequent surface treatment with a frost protection agent.

SUMMARY

It is an object of the present invention to provide an advantageous option for adjusting the height of a support arrangement for solar modules which can be subjected to high loads.

The above and other objects are achieved according to the invention by the provision of a support arrangement for a solar module, which in one embodiment comprises: a post having a first surface section; a support structure including a connecting element presenting a second surface section facing the first surface section in a direction of a joint surface normal of the first and second surface sections; a stop element arranged in the surface normal direction offset to the first surface section and the second surface section, a first form-fitting connection between the stop element and the post and a second form-fitting connection between the stop element and the connecting element providing vertical support of the connecting element relative to the post, wherein the first and second form-fitting connections are producible at different heights of the connecting element relative to the post; and a fastening element to hold in place the first surface section and the second surface section relative to each other in the direction of the joint surface normal.

As a result of the at the least one stop element, provided in addition to the standard fastening elements, the invention permits at least a partial separation between the height adjustment and the mounting. In particular, a high stability of the vertical support can be combined with an especially favorable way of handling the adjustment of the height position in that the opposite-arranged surface sections of the post and the connecting element, as well as the stop element, remain in a captive connection when the fastening element is loosened while still permitting a vertical displacement of the connecting element, relative to the post, and allowing at least one of the two form-fitting connections to be changed.

The components which must absorb the supporting forces, meaning the posts, the connecting elements and the stop elements, are preferably made of steel and can advantageously be embodied of non-rusting steel or can be embodied to have a surface treated with rust-preventing material, in particular a galvanized surface.

The first and second form-fitting connections in this case are understood to refer to the interlocking components of at least two structural parts which function to mutually support each other in a form-fitting connection for two components in the vertical direction. With respect to a force support or a displacement, the vertical direction is understood to also include a slight angle deviating from the perpendicular line, for example if the connecting elements are tilted around an essentially horizontal axis. Also understood is that the horizontal direction includes a slight deviation. Horizontal and vertical directional information relates to the typical setup for the support arrangement over a horizontal, flat area.

The support arrangement according to the invention can be used advantageously with known and proven structures, having screws or threaded bolts as fastening elements which extend through the first and second surface sections and tighten the two surface sections against each other in the locked state. The connecting element typically fits with two second surface sections, which can be embodied as connecting element in the form of welded together web plates, against two sides of first surface sections on the post which are facing away from each other but are arranged parallel to each other. In particular with closed hollow profiles, the fastening elements can be embodied as threaded bolts, screws or the like which extend through the first and the second surface sections or, especially with post profiles that are open on one side, such as the frequently used sigma profiles, the fastening elements can be embodied as two separate fastening elements for each combination of a post and connecting element. The post can furthermore be a two-part steel profile which is inserted and especially rammed into the ground and is subsequently provided with a post head attached to the upper end on which the first surface section of the post is embodied.

BRIEF DESCRIPTION OF THE DRAWINGS

The invention is illustrated in further detail in the following, with the aid of preferred embodiments and with reference to the Figures, showing in:

FIGS. 6A and 6B Different height positions for the connecting element;

FIGS. 7A and 7B A variant of FIGS. 6A and 6B, respectively;

FIGS. 8A and 8B A different variant of FIGS. 6A and 6B, respectively;

DETAILED DESCRIPTION

Figure 1:
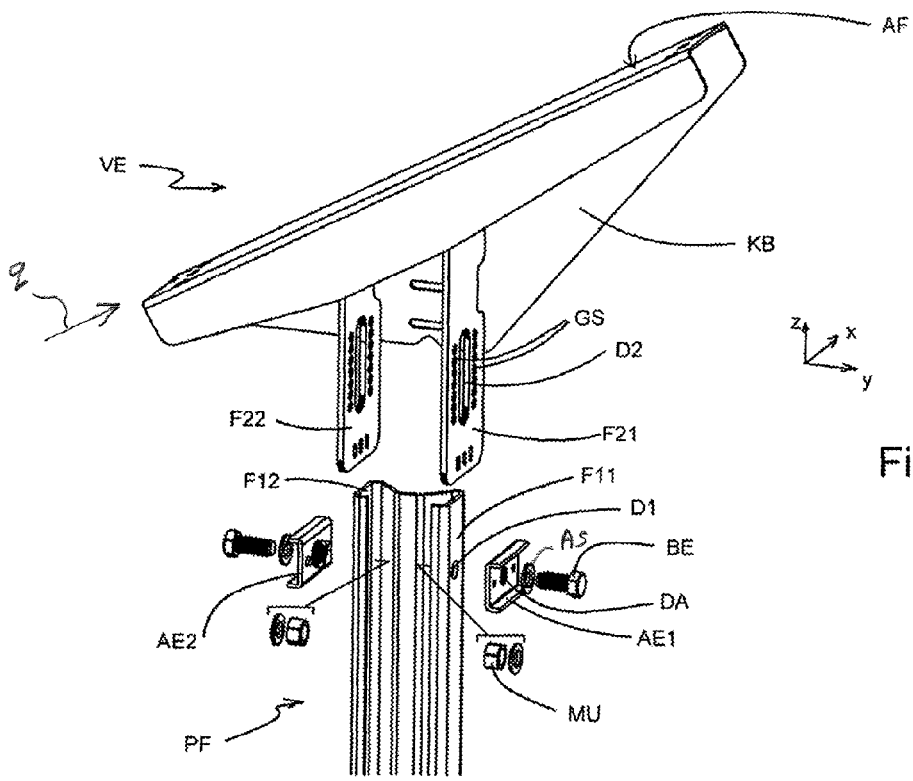
FIG. 1 An exploded view of a compilation of components for a support arrangement according to the invention.

FIG. 1 shows in an exploded view the components which are essential to the invention for an exemplary embodiment of a support arrangement for solar modules, wherein the components are shown separately prior to being assembled. Also drawn in is a right-angle x-y-z coordinate system, wherein the x direction denotes a horizontal line in which longitudinal supports extend for a support arrangement that is not shown herein and in which a plurality of spaced-apart posts are successively lined up in a row. The y direction is a horizontal direction which is orthogonal to the x direction, whereas z denotes the vertical direction. A cross direction in the z-y plane, which is slanted relative to the z and y direction, is given the reference q. In the completed solar system, flat solar modules rest in a q-x plane on the support arrangement, at an angle to the horizontal line.

A post PF, shown as a partial representation in FIG. 1, comprises in a manner known per se a so-called sigma cross section which has an additional indent in the center leg as compared to the C cross section. The post PF comprises two surface sections F11, F12, spaced apart in y direction and positioned in vertical x-z planes, for which the surface normal points in the y direction. The surface sections F11, F12 of the post PF form the first surface sections. The post is typically rammed into the ground, if applicable by first drilling a hole. An opening D1, in particular a bore hole, is provided in each of the first surface sections F11, F12 through which a fastening element BE can be extended, in particular a screw or a threaded bolt or the like. With the posts having a sigma cross section, respectively one fastening element BE is provided for each of the first surface sections F11, F12. With other post cross sections, a fastening element can also be provided which extends in y direction through the aligned openings in the spaced-apart first surface sections F11, F12.

A connecting element VE comprises two web plates F21, F22 for which the plate surfaces are positioned at a distance to each other in the direction of their surface normal. The web plates F21, F22 form the second surface sections on the side of the connecting element VE. In the assembled state, the plates comprising the second surface sections F21, F22 are located in the x-z planes and the joint surface normal extends in y direction. The web plates F21, F22 are connected, in particular welded, to a console panel KB which has a support surface AF positioned in a q-x plane. Longitudinal supports that are known per se from the prior art and extend in x direction can be placed onto the support surfaces AF and can be connected to the console panel KB. Module supports extending in q direction for supporting the solar modules can in turn be attached to the longitudinal supports.

In the second surface sections F21, F22, openings D2 in the form of elongated holes are provided for the preferred example of the invention, wherein the openings D2 in the second surface sections F21, F22 are arranged so as to be aligned in y direction. In addition, counter structures GS are provided in the second surface sections F21, F22, which will be described in further detail in the following with the aid of the Figures and which cooperate with stop structures AS of the stop elements AE1, AE2. The counter structures GS in particular can be embodied in the form of openings, preferably bore holes, extending through the second surface sections F21, F22.

Provided as essential elements for the support arrangement according to the invention are furthermore the stop elements AE1, AE2, with thereon embodied stop structures, for example locking cams NO, which cooperate with the counter structures GS on the second surface sections F21, F22, as previously mentioned.

When setting up the support arrangements, consisting of the components shown in FIG. 1, the connecting element is arranged in such a way on the post PF that the second surface sections F21, F22 fit tightly against the sides pointing toward the outside of the first surface sections F11, F12. In the starting state, the mutual spacing in y direction between the two surface sections F21, F22 is typically slightly larger than the outside dimensions of the post PS between the first surface sections F11, F12, thus making it possible in particular to take into account production tolerances. In the assembled position outlined in FIG. 2, the second surface sections F21, F22 encompass from the outside the first surface sections F11, F12 and are oriented such that the openings D1 in the first surface sections are projected to be aligned in y direction with the openings D2 located in the second surface sections.

Figure 2:
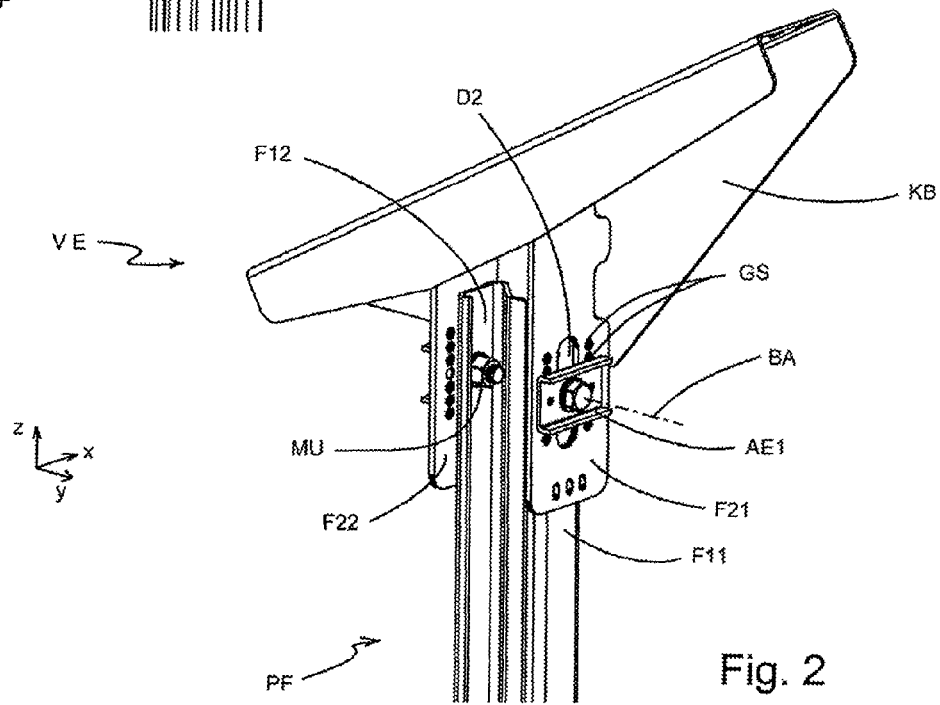
FIG. 2 The components, shown in FIG. 1, in a fastened state.

The stop elements AE1, AE2 are also provided with openings DA which, in the assembled state, are aligned with the openings D1 in the first surface sections. The stop elements AE1, AE2 fit against the outsides of the second surface sections F21, F22, which are facing away from the first surface sections, while the cams NO and the counter structures GS for the embodiment shown in FIG. 2 are mutually engaged in a form-fitting connection. Fastening elements BE are guided in the direction of an element axis BA, extending in y direction, through the openings DA in the stop elements, the openings D2 in the second surface sections, and the openings D1 in the first surface sections. In particular, the fastening elements can be screws which are screwed into the nuts MU, positioned on the insides of the first surface sections F11, F12.

The connecting element VE with thereon arranged support structure and solar modules is supported in the vertical direction via the second surface sections F21, the second form-fitting connections produced by the engagement of the counter structures GS and the cams NO, the stop elements AE1, AE2 and first form-fitting connections produced with the aid of the fastening elements BE between the openings DA in the stop elements and the openings D1 in the first surface sections. No direct form-fitting connection exists in the assembled state between the second surface sections F21, F22 on one side and the first surface sections F11, F12 on the other. However, the connecting element on the post PF can still be supported via the stop elements AE1, AE2 and the aforementioned form-fitting connection.

Figure 3:
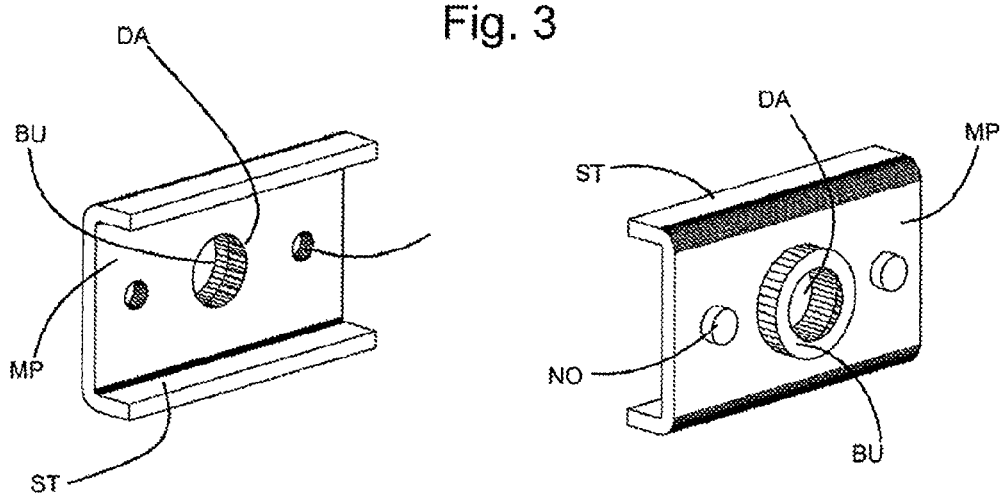
FIG. 3 Front and back perspective views of a stop element that may be used to implement the invention.

FIG. 3 shows two different views of an advantageous embodiment of a stop element which can be produced, in particular, by reshaping a flat sheet-metal blank. The outlined stop element comprises a center plate section MP from which two edges ST are bent over, so as to stabilize the shape of the stop element when it is used. An opening DA in the center is advantageously embodied in the shape of a short bushing extension BU which projects over the plate surface of the plate section MP. The inside diameter of the bushing extension BU is matched to the shaft diameter for the fastening elements BE which, in the assembled state, extend through the opening DA. The opening DA with the bushing extension BU can be produced, in particular, through reshaping of the flat plate section MP.

Two cams NO which are preferably arranged symmetrical to the opening DA also project from the plate surface of the plate section MP. The extensions of the bushing BU and the cams NO projecting on opposite sides of bushing BU, are directed counter to the orientation of the edges ST, relative to the plate section MP.

In the assembled position shown in FIG. 2, the plate section MP is located in a plane x-z and the projecting parts of the cams NO and the bushing extension BU and/or the angling of the edges ST point in opposite directions parallel to the y direction. The cams NO and the opening DA are essentially positioned along a line in x direction. Along the edges of the plate section MP, which extend in x direction, the edges ST are angled toward this plate section.

It is advantageous if the cams NO essentially have a perfect cylindrical shape and, for the preferred embodiment, are formed through cold-forming with the aid of an extraction tool from the plate surface of the plate section MP.

Figure 4:
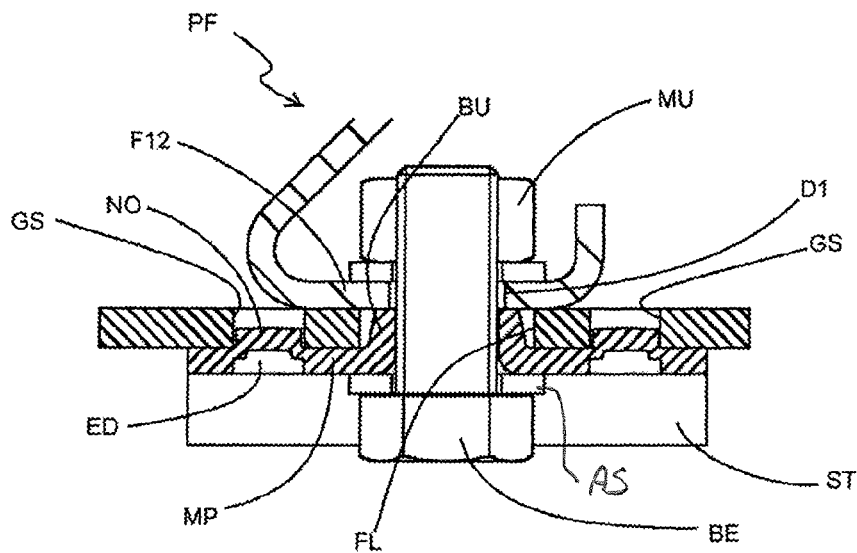
FIG. 4 A horizontal section through a fastening location.
Figure 5:
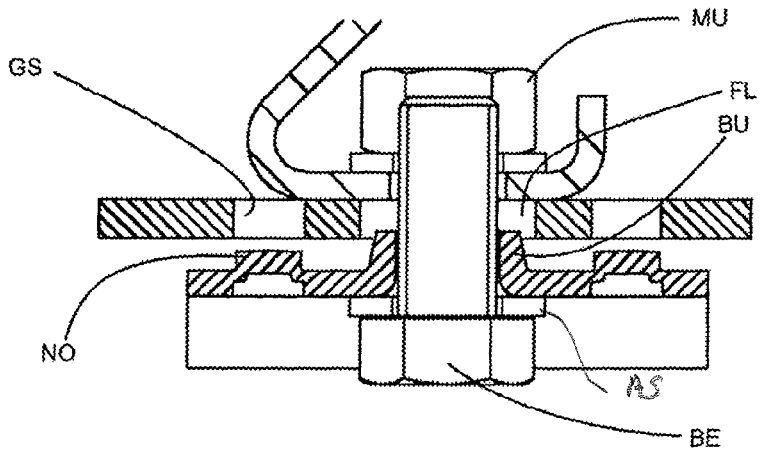
FIG. 5 The horizontal section shown in FIG. 4 in which the fastening location is in a state where the fastening is not tightened.

FIG. 4 and FIG. 5 show views with x-y sectional planes through the element axis BA of a fastening element BE, wherein the fastening element BE shown in FIG. 4 is screwed fixedly into the nut MU as counter element and wherein FIG. 5 shows a connection that is loosened as compared to FIG. 4.

In the fastened state according to FIG. 4, showing the tightened screw connection between a screw as fastening element BE and a nut on the inside of the first surface section F11 of the post PF, the second surface section F21 is tightened against the first surface section F11 and fits flush against it. The stop element AE1 fits on one side with the plate section MP against the outside of the second surface section F21 that is facing away from the first surface section F11 and engages with the cams NO, which form the stop structures, in the counter structures formed by bore holes in the second surface section F21. The bushing extension BU at the same time rests within the opening D2 in the form of an elongated hole FL in the second surface section. The bushing extension BU is aligned with the opening D1 in the first surface section F11. The screw shaft as fastening element BE extends through the opening DA in the bushing extension BU and through the opening D1 in the first surface section F11. A spacer AS can be inserted in the standard manner between the screw head and the plate section MP of the stop element. The projecting portion of the bushing extension BU, relative to the surface of the plate section MP, is larger by a slight degree than the portion of the cams NO that projects over the plate surface of the plate section MP.

If the fastening element BE is unscrewed slightly from the nut MO, as compared to the fastening position shown in FIG. 4, then the plate section MP of the stop element AE1 can be pushed in y direction, relative to the second surface section F21 and away from this second surface section, so that the cams NO which form the stop structures leave the previous form-fitting engagement in the bore holes functioning as the counter structures GS in the second surface section F21. In the process, a thin gap can form again between the first and the second surface sections. The bushing section BU can still be located inside the opening D2 through the second surface section, which is formed by the elongated hole FL, even if the cams NO have been moved out of the counter structures GS. If the cams NO of the stop element are moved out of the counter structures GS, the second form-fitting connection is released and the connecting element can be displaced perpendicular to the drawing plane in FIG. 5, relative to the post PF. The displacement perpendicular to the drawing plane shown in FIG. 5 represents a change in vertical z direction. The position of the stop element AE1, relative to the post PF and/or its first plate section, remains unchanged because of the continued form-fitting connection, generated by the shaft for the fastening element extending through the opening D1 in the first surface section F11 and the opening DA in the stop element.

The displacement of the connecting element in z direction, relative to the post PF and the stop element AE1 in the non-tightened position of the fastening element as shown in FIG. 5, makes it possible to move the connecting element to a different height position, relative to the stop element, in which the cams NO which function as the stop structures are again aligned with the counter structures GS in the second surface section F21. By moving the stop element to the second surface section F21, the element can once more assume a second form-fitting connection once the cams NO engage in the counter structures GS.

Viewed in the y direction onto a second surface section F21 and a stop element AE1, the two representations (A) and (B), of FIG. 6 represents two height positions that differ vertically by a height adjustment step HS of the second surface section F21, relative to the opening DA through the stop element which is considered fixed. In FIG. 6, the fastening element which extends with its shaft through the opening DA in the stop element has been omitted to provide a clearer view.

For the exemplary embodiment outlined in FIG. 6, the counter structures GS comprise two vertical rows of bore holes, for which one row is arranged on each side of the elongated hole FL and the bore center points can be offset in the vertical direction, relative to each other, by a grid spacing RM. Successively following bore holes in the vertical direction are separated by material webs, so that the structures have a high stability against tearing of the bore holes RS, even if they are subjected to a high load.

The example outlined in FIG. 6(A) is intended to show a height position for the second surface section F21, for which the cams NO of the stop element are engaged in the second bore holes, counted from the top, of the parallel-arranged rows of holes in the counter structures GS. In contrast, FIG. 6(B) shows a height position for the second surface section F21, following a vertical upward displacement of the connecting element, wherein the cams NO of the stop element AE1 in this new position are engaged in the third bore holes of the row of holes, as counted from above. In this way, the second surface section F21 and/or the connecting element VE with therein rigidly arranged second surface section F21 can thus be adjusted in the vertical direction for different height positions by using the steps HS which correspond to the grid spacing RM of the rows of holes. In the non-tightened position of the fastening element according to FIG. 5, the individual components remain connected to each other in a captive connection and the handling is particularly advantageous. Owing to the support provided in the second form-fitting connection via the two cams NO and the associated bore holes in the counter structures GS, the supporting force is distributed over two partial connections in the second form-fitting connection, and the diameter of the cams and/or the bore holes which form the counter structures GS can be clearly reduced as compared to a simple support, such as the one via the fastening element BE and the openings DA in the stop element and D1 in the first surface section. Taking into account the material webs MS, which must be provided for stability reasons, this favors in turn a closer arrangement of the bore holes GS in vertical direction and thus a small grid spacing and small steps for the vertical adjustability.

Additional openings DS are drawn into FIG. 6, at the lower end of the second surface section F21, which can be provided, in particular, to support the connecting element VE in such a way that it can be tilted around the element axis BA of the fastening element. In the non-level terrain, this arrangement is designed to allow a positioning of the longitudinal supports, which rest on the support surface AF of the connecting element and are attached thereto, which deviates from the precise horizontal direction x and makes it possible to adapt the support surface AF precisely to the orientation of the longitudinal supports while the vertical alignment of the posts remains unchanged. In particular following a precise adjustment in height and angle orientation of the connecting element, relative to the post PF, an additional fixing element and especially a self-drilling screw is screwed into one of the openings DS and through the first surface section of the post PF, thus fixing the angle orientation of the connecting element around the element axis BA of the fastening element.

Whereas for the previously explained example the height adjustment of the connecting element, relative to the post, occurs in vertical steps which are equal to the grid spacing of the rows of holes in the second surface section, FIGS. 7 and 8 show embodiments where the height can also be adjusted in smaller steps which equal half the grid spacing of the rows of holes in the second surface section. The individual images shown in FIGS. 6 to 8 are respectively positioned with the vertical position, e.g. the element axis BA of the fastening elements, at the same distance to each other in z direction, wherein the respectively used holding elements are also shown separately.

According to FIG. 7, it is therefore provided that on the stop element AD-A, AD-B, the center point of the opening DA, which coincides with the element axis for the fastening element and through which the stop element projects, does not coincide with the connecting line through the center points of the locking cams NO, but is displaced transverse thereto. Nevertheless, the opening DA is still arranged in the center between the cams that are positioned with a distance to the side. The grid for the rows of holes remains unchanged, as compared to the previous example, and in particular also has the same grid spacing RM for the bore holes that follow successively in the vertical direction. The offset of the center point for the opening DA in the holding element, relative to the connecting line for the center points of the locking cams, is given the reference DN and amounts to 25% of the grid spacing RM for the rows of holes.

The stop element can be inserted with two orientations, which are offset by 180° around the fastening element, wherein as opposed to the previously described stop element, the two angle positions differ in such a way that in the one case, shown in FIG. 7(A), the cams are positioned below the center point of the opening DA and in the other rotational position, shown in FIG. 7(B), the cams are positioned above the center point of the opening. The two rotational positions for the stop element in the separate representations of the stop element are given the references DA-A and DA-B, corresponding to the Figure components (A) and/or (B). As a result of the symmetrical arrangement of the cams, their position in side direction is the same in both rotational positions, relative to the center point of the opening through the plate section. The vertical positions of the cams differ for the two rotational positions of the stop element by a vertical difference HD which is equal to half the grid spacing for the rows of holes.

Since the position of the element axis BA and/or the center point of the opening DA that extends through the plate section MP is fixedly predetermined, owing to the bore hole D1 in the first plate section F11 and the fastening element, the absolute height position of the locking cams varies by half the grid spacing of the rows of holes when the stop element AD is rotated by 180° in the non-tightened position of the fastening element. Since the height position of the locking cams during the engagement in the bore holes of the counter structures determines their vertical height position, the resulting height positions differ by an amount HD which correlates to half the grid spacing RM for the rows of holes, in dependence on the rotational position of the stop element around the fastening element. In FIGS. 7(A) and (B), the same bore holes of the hole grid in the second surface section are selected to be used for the second form-fitting connection, so that in the rotational position of the stop element according to FIG. 7(A), in which the cams are located below the opening center and/or below the element axis, the height position of the second surface section and/or the connecting element which is connected rigidly thereto is lower by half a grid spacing than the one shown in FIG. 7(B) for the rotational position of the stop element where the cams are positioned above the element axis.

A height adjustment option with steps HD thus results, wherein a step is equal to half the grid spacing for the rows of holes. Of course, a height adjustment in steps equal to the grid spacing RM is also possible, wherein the stop element in that case is not rotated around the element axis.

FIG. 8 illustrates a different embodiment which also allows using half steps for the height adjustment. For the example outlined in FIG. 8, the rows of holes with respectively uniform grid spacing in vertical direction, wherein these rows are located to the left and to the right of the elongated hole in the first surface section, are offset in height, relative to each other, by a measure equal to half the grid spacing. That is to say, with respect to height the bore holes of the one row are staggered relative to the holes in the other row of holes.

For this example, a stop element AK with two locking cams NO and a central opening DA is configured such that the center point BA of the opening DA through the plate surface MP is located on a straight line with the two cams NO and that the cams are positioned at the same distances to the center point of the opening. The spacing between the cams and the distance to the center point of the opening slightly exceeds that of the horizontal distance between the two rows of holes. The stop element can be inserted into two different bore hole positions of the grid for producing a form-fitting connection between the cams, wherein each time the connecting line between the cams is tilted at a slight angle relative to the horizontal line. In the two insertion positions, the center point of one of the two cams is respectively positioned lower by a height difference DN and the center point of the other of the two cams is located higher by the same difference DN than the height of the element axis BA. The line can be tilted either in the clockwise direction or also in the counter-clockwise direction. In FIG. 8, in turn, the stop elements are again drawn in at two locations (A) and (B), showing different angles for the form-fitting engagement in the rows of holes, and are also drawn in separately above these locations with the references AK-A, AK-B. Producing a form-fitting connection between the cams and the bore holes is possible only in the two positions tilted in opposite directions.

Since the height of the center of the opening through the plate surface MP of the stop element is again determined by the opening D1 in the first surface section of the post and by the fastening element BE that extends through this opening, the two rotational positions of the stop element determine two different height positions for the locking cam which complement each other in connection with the staggered rows of holes in the second surface section, so as to form possible vertical positions of the second surface section for which the step width HK of the height adjustment amounts to half the grid spacing RM of the individual rows of holes.

Figure 9:
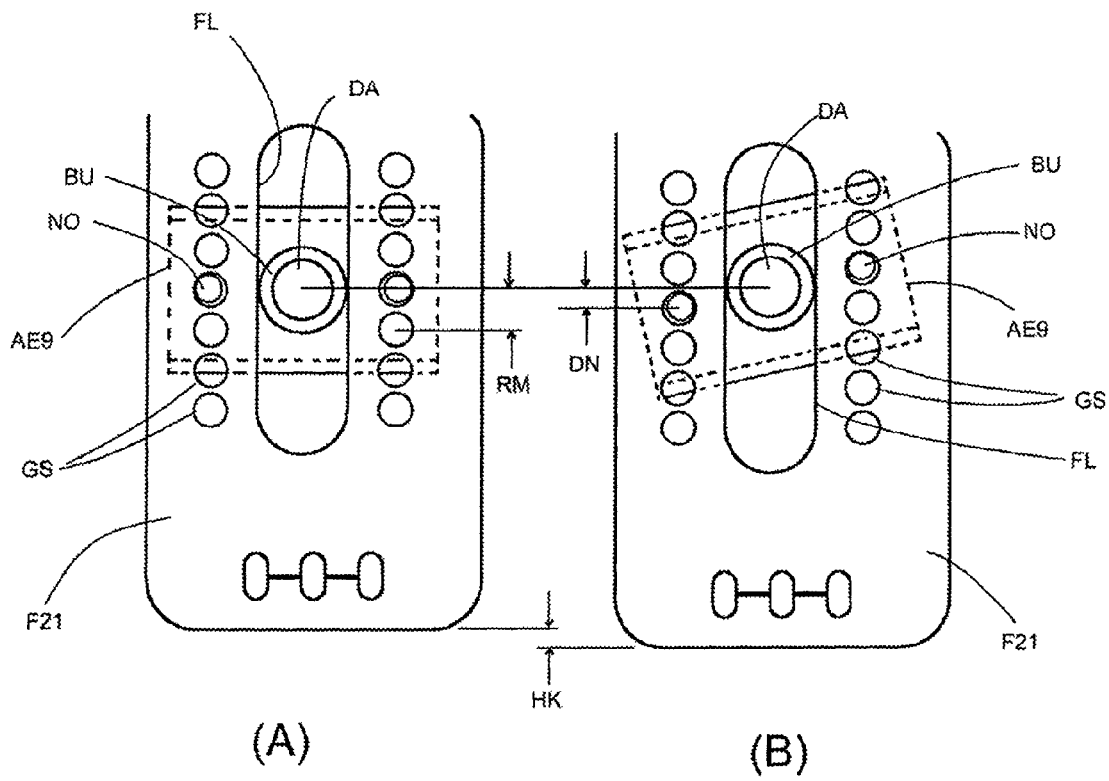
FIGS. 9A and 9B Yet another variant of FIGS. 6A and 6B, respectively.

FIG. 9 shows a different variant which can be used for a height adjustment of the connecting element, relative to the post, using a reduced step width as compared to a hole grid, wherein the stop element is again tilted around the axis of the fastening screw. The rows of holes in the second surface section F21 of the connecting element are arranged on both sides of the elongated hole FL, at the same height relative to each other, as shown for the example in FIG. 6. The stop element, which is essentially configured identical to the stop element AE1 in FIG. 6, is arranged in FIG. 9(A) with the same orientation as in FIG. 6, relative to the second surface section F21. The vertical height of the stop element AE9 is fixed, with respect to its center for the bushing extension BU which surrounds the opening DA, wherein the fastening screws BE, which are not drawn into FIG. 9, extend through this opening. In the orientation of the stop element AE9 with horizontally extending connecting line between the two cams NO, the connecting element can be adjusted vertically in the grid spacing RM of the rows of holes GS.

According to the exemplary embodiment shown in FIG. 9, the cams NO and the holes in the rows of holes GS are coordinated in such a way that for the orientation of the stop element AE9 shown in FIG. 9(A), the cams NO not only can engage in opposite-arranged bore holes of the rows of holes GS, but that following a tilting of the stop element AE9 into the position shown in FIG. 9(B), the two cams NO of the stop element can also engage in respectively one bore hole of the opposite-arranged rows of holes. In that case, the bore holes in the left and the right row of holes, in which the two cams NO of the stop element AE9 are engaged, are not offset in height by one grid spacing. Relative to the center point of the opening DA in the stop element, the two cams are displaced in height either up or down by an offset DN which essentially is equal to half the grid spacing RM. It is illustrated at the lower edges of the second surface section F21 that with the tilted position of the stop element AE9, as shown in FIG. 9(B), the second surface section F21 and thus also the connecting element can be displaced in height by a step width HK, relative to the position of the stop element AE9 in FIG. 9(A), wherein the adjustment step HK is equal to the height offset DN of the cams NO, relative to the center point of the opening DA, and equal to half the grid spacing RM of the rows of holes. The stop element AE9 is advantageously embodied mirror-symmetrical, relative to a center plane, so that a tilting with respect to the orientation shown in FIG. 9(A) is possible in both rotational directions. To allow the cams NO to engage in the bore holes of the rows of holes GS either in the non-tilted orientation of the stop element or in the tilted orientation for the stop element, the cams NO are slightly undersized as compared to the diameter of the bore holes GS, wherein the undersized dimensions can be extremely small because of the small tilting angle. The representation according to FIG. 9 should therefore not be understood as being to scale. The viewing direction for the representation according to FIG. 9 is parallel to the axis for the fastening screw BE and is seen from the inside of the second surface section F21. The hidden edges of the stop element AE9 are drawn in with dashed lines in this view.

The features listed in the above and in the claims, as well as the features that follow from the Figures, can be realized advantageously by themselves or also in different combinations. The invention is not restricted to the described exemplary embodiments, but can be modified and embodied in different ways within the framework of expert knowledge.

The invention claimed is:

1. A support arrangement for a solar module, comprising:
a post having a first surface section;
a support structure including a connecting element presenting a second surface section facing the first surface section in a direction of a joint surface normal of the first and second surface sections;
a stop element arranged in the surface normal direction offset to the first surface section and the second surface section, a first form-fitting connection between the stop element and the post and a second form-fitting connection between the stop element and the connecting element providing vertical support of the connecting element relative to the post, wherein the stop element comprises a first plate section with stop structures embodied thereon, the stop structures comprising projections on the first plate section, and wherein the connecting element includes counter structures in a form of depressions which match the projections on the stop element, wherein the first and second form-fitting connections are producible at different heights of the connecting element relative to the post with the use of the projections and depressions which constitute the second form fitting connection; and
a fastening element to hold in place the first surface section and the second surface section relative to each other in the direction of the joint surface normal.

2. The arrangement according to claim 1, wherein the fastening element comprises a threaded connection.

3. The arrangement according to claim 1, wherein the stop element has an opening through which the fastening element extends and the fastening element together with said opening forms the first form-fitting connection between the post and the stop element.

4. The arrangement according to claim 1, wherein the second surface section includes counter structures and the stop includes locking structures to engage the counter structures on the second surface section of the connecting element to form the second form-fitting connection.

5. The arrangement according to claim 4, wherein the counter structure comprises a plurality of counter-structure elements, vertically offset against each other, which correspond to different height positions for the second surface section, relative to the stop element, and can alternatively be selected to engage with the locking structure.

6. The arrangement according to claim 5, wherein the counter structure elements in the counter structure form a grid extending in a vertical direction.

7. The arrangement according to claim 6, wherein the stop element is arrangeable in at least two different angle positions around the fastening element, thereby producing a changeable form-fitting connection.

8. The arrangement according to claim 7, wherein the stop structures in the different angle positions assume at least in part different height positions relative to the post.

9. The arrangement according to claim 1, wherein the second surface section comprises a vertically extending elongated hole.

10. The arrangement according to claim 1, wherein the stop element is arranged on a side of the second surface section facing away from the first surface section on the post.

11. The arrangement according to claim 1, wherein the connecting element is displaceable in height relative to the post when the fastening element is adjusted to be in a non-tightened state so that the post, the connecting element and the stop element are no longer in a form-fitting connection but are still loosely connected.

12. The arrangement according to claim 1, wherein the depressions comprise adjacent bore holes spaced apart by material webs.

13. The arrangement according to claim 1, wherein the first plate section includes an opening through which the fastening element is extended.

14. The arrangement according to claim 13, further comprising a bushing formed around the opening in the first plate section of the stop element.

15. The arrangement according to claim 14, wherein the connecting element comprises a second plate section and the bushing projects further in a same direction as the stop structures over first the plate section and is positioned to be vertically displaceable inside a recess of the second plate section.

16. The arrangement according to claim 1, wherein the connecting element is holdable in place at different angle orientations within a limited pivoting angle range around a pivoting axis extending parallel to the joint surface normal.

17. The arrangement according to claim 2, wherein the threaded connection comprises a threaded bolt.

* * * * *